No. 694,667. Patented Mar. 4, 1902.
W. C. ROWE.
FEED DRAG FOR CORN SHELLERS.
(Application filed July 27, 1901.)
(No Model.) 3 Sheets—Sheet 1.
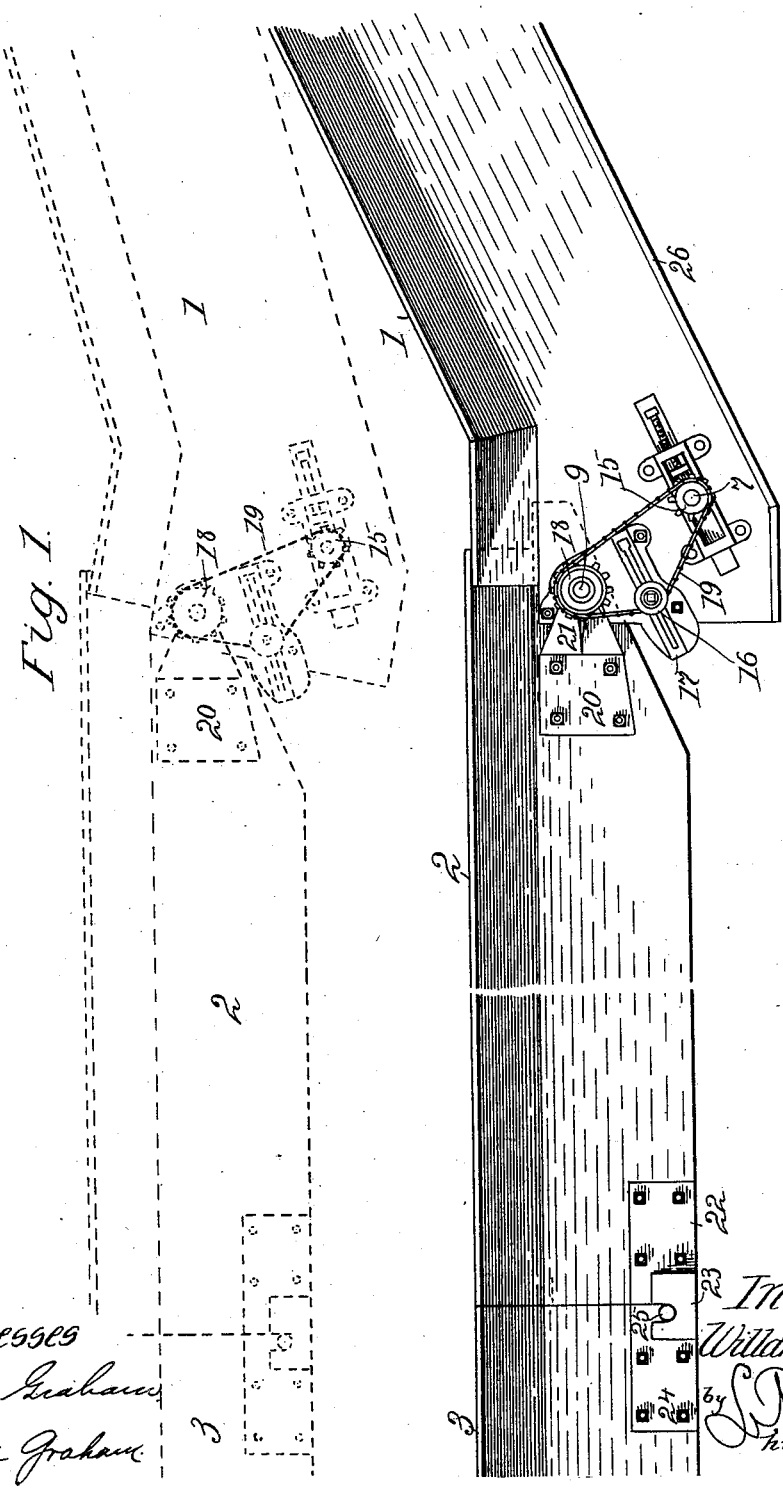

No. 694,667. Patented Mar. 4, 1902.
W. C. ROWE.
FEED DRAG FOR CORN SHELLERS.
(Application filed July 27, 1901.)
(No Model.) 3 Sheets—Sheet 2.
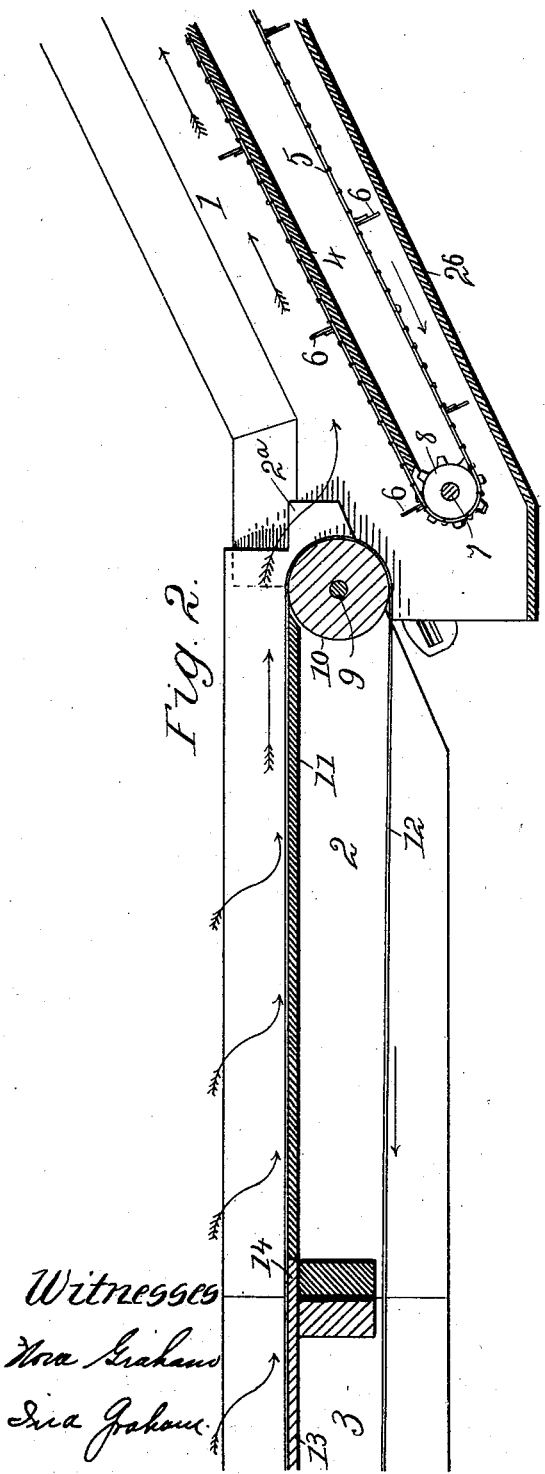
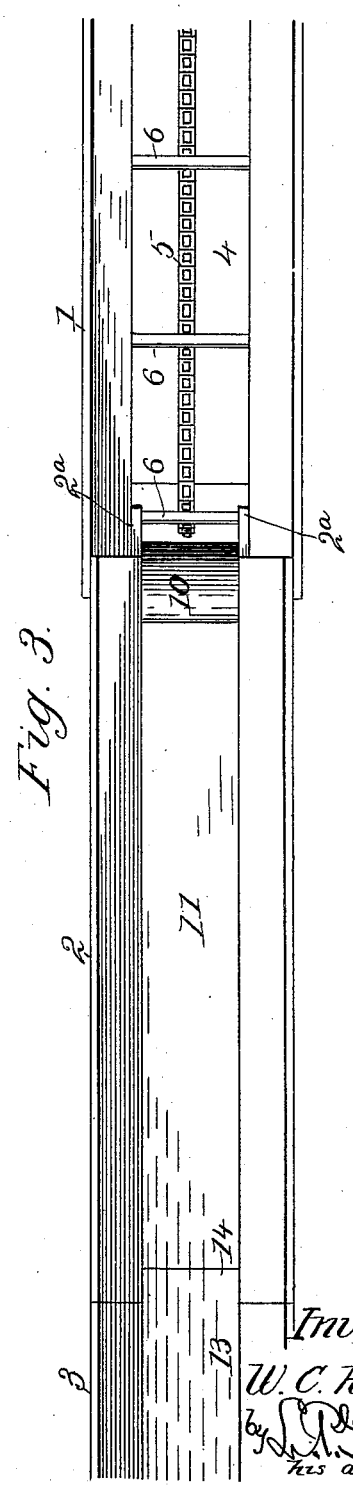

No. 694,667. Patented Mar. 4, 1902.
W. C. ROWE.
FEED DRAG FOR CORN SHELLERS.
(Application filed July 27, 1901.)
(No Model.) 3 Sheets—Sheet 3.
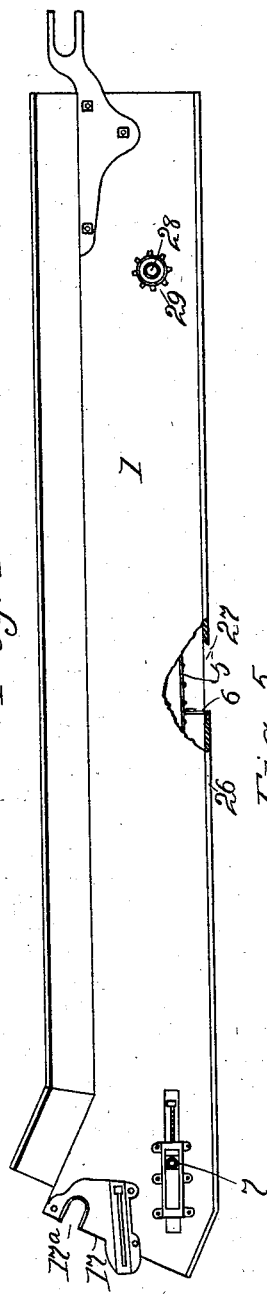
Fig. 4.
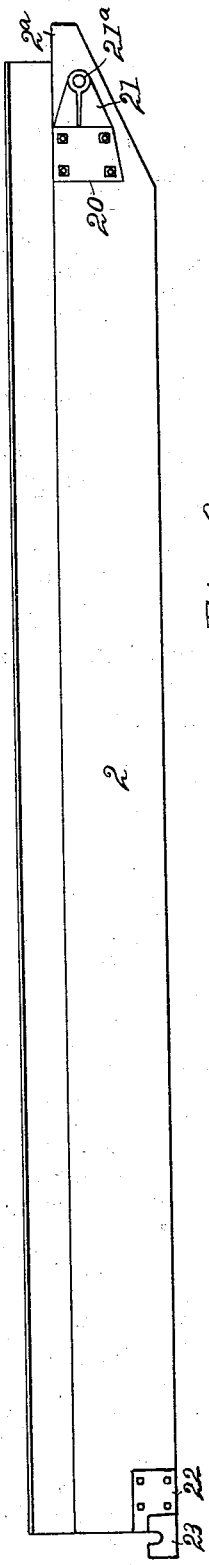
Fig. 5.
Fig. 6.
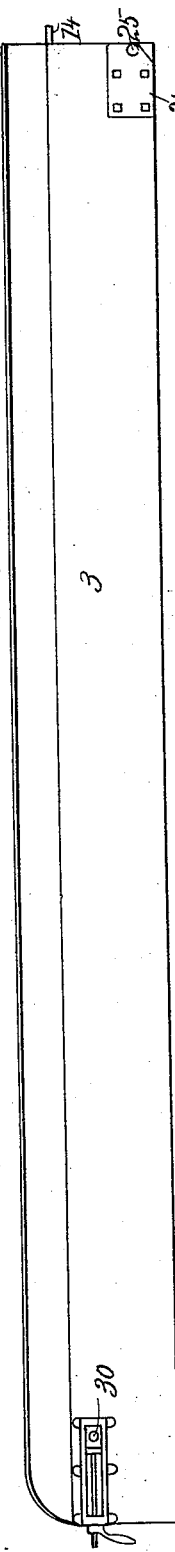
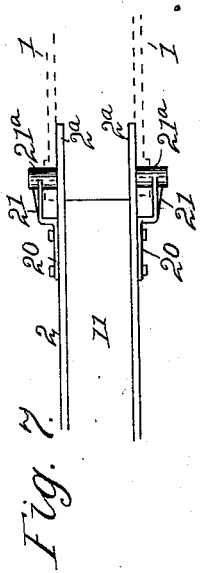
Fig. 7.
Witnesses.
Nora Graham
Ina Graham
Inventor,
W. C. Rowe
by Graham
his attorney
THE NORRIS PETERS CO., PHOTO-LITHO., WASHINGTON, D. C.

UNITED STATES PATENT OFFICE.

WILLARD C. ROWE, OF DECATUR, ILLINOIS.

FEED-DRAG FOR CORN-SHELLERS.

SPECIFICATION forming part of Letters Patent No. 694,667, dated March 4, 1902.

Application filed July 27, 1901. Serial No. 69,930. (No model.)

*To all whom it may concern:*

Be it known that I, WILLARD C. ROWE, of the city of Decatur, county of Macon, and State of Illinois, have invented a certain new and useful Feed-Drag for Corn-Shellers, of which the following is a specification.

This invention provides a feed-drag the horizontal part of which may occupy various positions, higher or lower, with relation to the discharge end of the inclined part, that will maintain a straight line in resistance to side thrust, and that will enable the inclined part to readily handle the corn delivered to it from the horizontal part. It is exemplified in the structure hereinafter described, and it is defined in the appended claims.

A practical modern feed-drag consists of a horizontal drag extension that is placed along a side of the bottom of a crib or cribs to receive corn therefrom and an inclined part that receives the corn from the horizontal extension and raises it to the feeder of the sheller. The height to which the corn is raised is substantially uniform, as the point to which the drag raises the corn is always about the same distance from the level of the ground; but the bottoms of cribs are at times raised above the level of the ground to accommodate driveways, for instance, and the drag needs to be adjustable at the conjunction of the horizontal part with the inclined part, so as to conform to changeable conditions. There is a constant accumulation of trash against the horizontal part of the drag nearest the crib. The horizontal part is ordinarily formed of a plurality of conjoined sections, and special provision is needed to prevent the horizontal part from moving away from the crib at the joints and deflecting the frame to an extent to interfere with the run of the drag-belt. The horizontal part has the advantage over the inclined part of not having to raise the corn, and so special provision is needed to enable the inclined part to carry all the corn the horizontal part can deliver to it, and these requirements are all met in my invention.

In the drawings forming part of this specification, Figure 1 is a side elevation of the lower end of the inclined part of the drag-frame, the intermediate horizontal section shortened to bring it within the limits of the sheet and the end of the terminal horizontal section that abuts against the intermediate horizontal section. In Fig. 1 the horizontal part of the drag is shown on the ground-level in solid lines and is shown in an elevated position in broken lines. Fig. 2 is a longitudinal vertical section through so much of the drag as is shown in Fig. 1. Fig. 3 is a plan of the matter shown in Fig. 2, the drag-belt being omitted from the horizontal section to show the means employed to stay the joint of the horizontal section against side thrust. Fig. 4 is a side elevation of the inclined part, a portion thereof being broken away to show a peculiarity in the construction of the bottom thereof. Fig. 5 is a side elevation of the intermediate section of the horizontal part of the drag. Fig. 6 is a side elevation of the terminal section of the horizontal part. Fig. 7 is a plan of the discharge end of the intermediate section with the inclined side boards thereof removed.

The inclined section is shown at 1, the intermediate horizontal section at 2, and the terminal horizontal section at 3.

At 4 is shown a transverse board in the inclined section, on which drag-chain 5 runs and along which the corn is elevated. The drag-chain has cleats 6, that act as drags. It runs on sprocket-wheels on shafts 7 and 28, the latter being shown in Fig. 4 only. It is driven through a sprocket-wheel 29 on shaft 28, and it drives shaft 7 through sprocket-wheel 8. The shaft 7 of the drag-belt is journaled in the lower end of the inclined section near the under side thereof, and slots 17$^a$ are formed in the lower ends of the side boards of the inclined section near the upper edges thereof. The slots are preferably reinforced by the slotted castings 17, and they form recesses into which the protruding ends of shaft 9 of the intermediate section may be inserted.

The intermediate section 2 is composed of side pieces and a transverse board 11, on which the drag-belt 12 runs. The intermediate section is narrower than the inclined section, and the extensions 2$^a$ of its sides fit between the sides of the inclined section. Brackets 20 are attached to the sides of the intermediate section near the end thereof that conjoins with the inclined section. Such brackets have extensions 21, that are separate from the sides of the section and that carry the tubular bearings 21ª. (Shown in Fig. 7.) The tubular bearings extend to the sides of the intermediate section, and their inward extensions are inserted into the slots 17ª of the inclined section when the sections are assembled, as shown in Figs. 1, 2, and 3. A shaft 9 is journaled in the tubular bearings carried by brackets 20, a sprocket-wheel 18 is attached to a protruding end of the shaft, and a drum 10 (shown in Figs. 2 and 3) is fastened to shaft 9 between the sides of the intermediate section. A chain 19 runs from a sprocket-wheel 15 on shaft 7 to the sprocket-wheel 18 on shaft 9 and imparts motion from the drag-chain to the carrying-belt 12. The chain has sufficient length to permit its ready detachment from the wheels, and the slack of the chain is taken up by an idler 16, which is slidably adjustable in bracket 17.

The terminal horizontal section 3 has a transverse board 13, that forms a continuation of the board 11 of the intermediate section. The end 14 of the board 13 protrudes beyond the end of the terminal section, as shown in Figs. 2 and 3, and rests between the sides of the conjoining end of the intermediate section. To provide for the insertion of board 13 into the intermediate section, the board 11 is shortened as much as the board 13 protrudes, and so the ends of the boards abut and their upper surfaces are flush one with the other.

The intermediate section has brackets, as 22, on the lower corners of its receiving end, and the brackets have hooked extensions 23, which protrude beyond the ends of the sides and turn upward. On the discharge end of the terminal section are brackets 24, secured to the lower corners of the end, and these brackets have laterally-projecting studs that engage the hooks of brackets 22 when the terminal section is connected with the intermediate section. In the receiving end of the terminal section is journaled a shaft 30, which carries a roller for the carrying-belt, and this shaft and shaft 9 of the intermediate section are higher than the studs 25 or the hooks 23.

When the sections are connected together, the conjoined ends of the terminal section and the intermediate section abut and are held against separation by the studs 25 engaging hooks 23. Gravity tends to hold the studs in the hooks, and the pull of the carrying-belt keeps the upper part of the abutting ends above the hooks in close contact.

The protruding end 14 of board 13 fits firmly between the sides of the intermediate section and stiffens the joint against side stress. The horizontal sections are made as light as is consistent with operative strength, the belt is not excessively heavy, and so it is possible for the horizontal part of the drag to be carried by two men, one at each end. While the two conjoined sections are being carried in the manner described the tenon stiffens in one direction, while the hooks and studs hold the joint against vertical displacement.

The nose of the intermediate section extends into the receiving end of the inclined section, the extensions 21 of brackets 20 embrace the end of the inclined section, and the bearings of shaft 9 rest in the slots of the inclined section. The connection of the horizontal sections with the inclined section is pivotal, the pivot is concentric with the shaft 9, and so the horizontal part may be raised or lowered, and the inclined part may be carried more or less nearly to a horizontal position without affecting the relation of shaft 7 to shaft 9. The horizontal sections are all of one width, and the carrying-belt therein is narrower than the drag in the inclined section. Moreover, the carrying-belt may be smooth, while the drag-chain is supplied with slats, and so the elevating-drag may be made to care for all the carrying-belt will deliver to it.

In operation the horizontal sections are laid alongside a crib or cribs, and siding-boards of the crib are removed to permit the corn to fall onto the carrying-belt. The carrying-belt is driven from the drag-chain through chain 19, and the corn is discharged onto the drag and elevated thereby.

As a matter of preference the bottom 26 of section 1 is cut away, as shown at 27 in Fig. 4, so as to permit the escape of trash, and the upper corners of the cut bottom are rounded off to facilitate the travel of the cleats of the drag.

If a specially-long feeder is desired, additional sections may be set into the horizontal run and conjoined by means of pins and hooks, as 25 and 23, and protruding boards, as 14.

To detach the horizontal part of the drag from the inclined part, the idler 16 is moved sidewise to give the needed slack to chain 19, the chain is detached from the wheels, and the bearings 21ª are pulled clear of slots 17ª.

I claim—

1. In a feeder-drag for corn-shellers, the combination of an inclined section having a horizontal extension at its lower end, an endless carrier in the inclined section, a horizontal section having its discharge end swung on a horizontal pivot in the receiving end of the horizontal part of the inclined section, a shaft concentric with the pivot, an endless carrier for the horizontal section driven by the shaft, and means for transmitting motion from the carrier of the inclined section to the shaft in the pivot of the horizontal section.

2. In a feeder-drag for corn-shellers, the combination of an inclined section having a horizontal extension at its lower end, such extension being provided with slots, an endless carrier for the inclined section having its receiving end located below the slots, a horizontal section having pivotal bearings adapted to rest in the slots of the horizontal part of the inclined section, a shaft extending through the pivotal bearings of the horizontal section, an endless carrier driven by said shaft and means for imparting motion to such shaft from the endless carrier of the inclined section.

3. In a feeder-drag for corn-shellers, the combination of an inclined section having a slotted horizontal extension at its lower end, an endless carrier for the inclined section, a horizontal section having its discharge end extended into the horizontal part of the inclined section, brackets on the sides of the horizontal section extending outside the inclined section, bearings carried by the brackets and resting in the slots, a shaft journaled in the bearings, an endless carrier for the horizontal section driven by the shaft, and a chain to convey motion from the carrier of the inclined section to the shaft.

4. In a feed-drag for corn-shellers, the combination of an inclined section, a horizontal extension on the lower end of the inclined section, such extension having slots in its sides to receive pivot-bearings, outward-inclined side boards on the sides of the inclined section and the horizontal extension thereof, an endless drag in the inclined section, a horizontal section narrower than the horizontal part of the inclined section and adapted to pivot therein, an endless drag-belt for the horizontal section, a drive-shaft for the drag-belt of the horizontal section journaled in the discharge end thereof and extending sidewise therefrom, circular journal-boxes for the drive-shaft outside the horizontal section such boxes being adapted to enter the slots of the horizontal extension of the inclined section, means for transmitting motion from the drag of the inclined section to the drive-shaft of the horizontal section, and oblique side boards on the horizontal section overlapping the oblique side boards of the horizontal extension of the inclined section when the two sections are conjoined, substantially as described.

5. In a feed-drag for corn-shellers, the combination, with an inclined section, of a horizontal part composed of abutting and conjoining sections hooked together and tenoned one into the other to sustain side stress.

6. In a feed-drag for corn-shellers, a horizontal part made up of abutting sections each composed of side pieces and a cross-board, an extension of the cross-board of one section tenoning into the conjoining section, hooks on the lower corners of one of the abutting ends and studs on the opposite section engaging the hooks.

In testimony whereof I sign my name in the presence of two subscribing witnesses.

WILLARD C. ROWE.

Witnesses:
INA C. GRAHAM,
NORA GRAHAM.